Patented Oct. 30, 1923.

1,472,334

UNITED STATES PATENT OFFICE.

ASA WILLARD JOYCE, OF NEWARK, NEW JERSEY, ASSIGNOR TO THE CHEMICAL FOUNDATION, INCORPORATED, OF NEW YORK, N. Y., A CORPORATION OF DELAWARE.

DISAZO DYES.

No Drawing.   Application filed June 15, 1922. Serial No. 568,634.

*To all whom it may concern:*

Be it known that I, ASA WILLARD JOYCE, a citizen of the United States, and a resident of the city of Newark and State of New Jersey, have invented an Improvement in Disazo Dyes, of which the following is a specification.

My invention relates to the production of disazo dye-stuffs and has an object a ready and practical mode suitable for the manufacture of such dyestuffs.

It has been ascertained by me that disazo dyes may be produced through the interaction of tetrazo derivatives of diamino diaryl ketones having the general formula

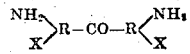

wherein X may indicate hydrogen and a halogen, and R may indicate an aryl grouping, with naphthol derivatives of the following general constitution:

wherein X and Y may signify hydrogen and a sulphonic acid group, and Z may signify hydrogen, an hydroxyl group, and chlorine, said dyestuffs ranging in shade from yellowish-red to violet and readily producing dyeings upon wool and silk which exhibit an excellent fastness to light, to washing, and to milling, are generally soluble in water, soluble in concentrated sulphuric acid, and are further characterized by conversion upon reduction, preferably with tin and hydrochloric acid, into diamino diaryl ketones and an amino derivative of a naphthol or a naphthol sulfonic acid.

For the preparation of these coloring matters I may employ diamino diaryl ketones which are obtainable from the corresponding diaryl methanes by a process described in the German Patent #289,108, which process consists, with particular reference to the preparation of diamino diphenyl ketone, in heating diamino diphenyl methane under a reflux for an extended period of time with a mixture of crystallized sodium sulphide and sulphur.

A diamino diaryl ketone obtained in accordance with the above outlined method is dissolved in water containing hydrochloric acid and diazotized by adding sodium nitrite thereto, the diazotized solution is then added to a solution containing a naphthol derivative, the mixture being subsequently heated to a temperature below the boiling point of said mixture and saturated with common salt whereupon the coloring matter is precipitated.

In order to more specifically set forth and describe my process for the manufacture of dyestuffs, the following examples, serving as illustrative embodiments of a manner in accordance with which my invention may be carried into practical effect, are given: The parts are by weight.

Example I.

21.2 parts of p.p.¹ diamino diphenyl ketone are diazotized with 50 parts of concentrated hydrochloric acid and 14 parts of sodium nitrite at 0° to 5° C. The diazo solution is added to a solution of 29 parts of beta-naphthol, dissolved in a solution containing 23 parts of caustic soda lye (40° Bé.) and 10 parts of sodium carbonate.

The dyestuff forms immediately and separates as a bright red precipitate. This precipitate is insoluble in water which renders it of value as a pigment.

In the form of its alkaline earth lake, for example with salts of barium and calcium, the lakes produced are a bright yellowish-red shade. Upon reduction under the influence of, for example, tin and hydrochloric acid, the dyestuff yields p.p¹ diamino diphenyl ketone and 1.2-amino naphthol.

Example II.

21.2 parts of p. p¹ diamino diphenyl ketone are diazotized as described in Example I, and allowed to run into a cold solution containing 70 parts of R-salt (sodium salt of 2-naphthol-3.6-disulfonic acid) and 35 parts of sodium carbonate. The dye forms immediately and partially separates as a brilliant red precipitate. After stirring for a period of time, the color mixture is heated to 80° and saturated with salt (NaCl).

In a dry state the dyestuff is a red powder soluble in water with a bright red color which is not altered in shade by the addition of acetic acid or sodium corbonate, and dissolves in concentrated sulphuric acid giving a violet colored solution. It dyes wool a bright scarlet red having marked fastness to light, to washing, and to milling.

Upon reduction under the influence of, for example, tin and hydrochloric acid, the dyestuff yields p.p¹ diamino diphenyl ketone and 1-amino 2 naphthol 3-6-disulphonic acid.

*Example III.*

21.2 parts of p.p¹ diamino diphenyl ketone are diazotized as described in Example I, and allowed to run into a cold solution containing 65 parts of 1.8-dioxynaphthalene-3.6-disulphonic acid and 130 parts of sodium carbonate. After stirring for a period of time the color mixture is heated to 80° C. and saturated with common salt, whereupon the dye is precipitated as the sodium salt.

In a dry state it constitutes a dark reddish-brown powder, readily soluble in water, soluble in concentrated sulphuric acid with a blue coloration, and on mild reduction with tin and hydrochloric acid gives rise to p.p¹ diamino diphenyl ketone and 2-amino-1.8-dioxynaphthalene-3.6-disulphonic acid.

When wool is dyed in the usual manner there is produced a bright bluish-red fast to light, to washing and to milling. Upon cotton a reddish-violet shade is obtained which is relatively fast to light, to acid and to washing.

The dyestuffs which may be obtained by a coupling of diamino diaryl ketones and their derivatives with naphthols, such as beta-naphthol and naphthol sulphonic acids, such as R-acid (2-naphthol 3-6-disulphonic acid) may be converted into lakes which are suitable for the preparation of red pigment colors. These coloring matters in a dry state range from a bright red to a dark red which dissolve in concentrated sulphuric acid with the formation of reddish-blue to greenish-blue solutions.

The diamino diaryl ketones which may be employed, it will be evident, may be either simple or mixed. Furthermore, it is to be understood that the invention is not limited to the specific constituents, amounts thereof, nor reaction condition set forth in the above examples, but that the same may be modified and varied within the scope of the sub-joining claims.

I claim:

1. As a new article of manufacture the coloring matters obtained by coupling one molecule of a diamino diaryl ketone of the general formula

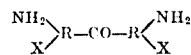

in which X may signify hydrogen and chlorine, and R may signify an aryl grouping, with two molecules of a naphthol derivative corresponding to the general formula

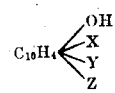

wherein X and Y may signify hydrogen and a sulphonic acid group and Z may signify hydrogen, an hydroxyl group and chlorine.

2. As a new article of manufacture, the coloring matter which is produced by coupling p.p¹ diamino diphenyl ketone with 2.naphthol 3.6.disulphonic acid, said coloring matter in a dry state being a red powder, soluble in concentrated sulphuric acid, soluble in water, dyes silk and wool bright red shades, fast to light, to acids, to washing and to milling, and when reduced with tin and hydrochloric acid forms p.p¹ diamino diphenyl ketone and 1.amino 2.naphthol, 3.6-disulphonic acid.

In testimony whereof, I have signed my name to this specification this 14 day of June, 1922.

A. WILLARD JOYCE.